United States Patent [19]
Alvarez et al.

[11] 4,291,862
[45] Sep. 29, 1981

[54] EXPANDING GATE VALVE

[75] Inventors: Patricio D. Alvarez, Rosenberg; James M. Fowler, Marble Falls; George A. Moran, Houston, all of Tex.

[73] Assignee: ACF Industries, Incorporated, New York, N.Y.

[21] Appl. No.: 79,682

[22] Filed: Sep. 28, 1979

[51] Int. Cl.³ ............................................. F16K 25/00
[52] U.S. Cl. ................................... 257/167; 251/196; 251/197
[58] Field of Search ............... 251/167, 196, 197, 203, 251/204

[56] References Cited
U.S. PATENT DOCUMENTS

| | | | |
|---|---|---|---|
| 600,181 | 3/1898 | Smith | 251/167 |
| 2,306,490 | 12/1942 | Noble | 251/196 X |
| 2,705,610 | 4/1955 | Hjulian | 251/196 X |
| 4,189,127 | 2/1980 | Constantino | 251/196 |

Primary Examiner—Harold W. Weakley
Attorney, Agent, or Firm—Eugene N. Riddle; Stephen T. Belsheim

[57] ABSTRACT

A gate valve structure has an expanding valve assembly mounted with the valve chamber comprising a gate (32) and segment (34) which may be laterally expanded. The gate and segment have a plurality of coacting interfitting saw-type teeth (46,48) which define cam surfaces (50,56) to effect expansion of the gate valve assembly. A flexible sleeve (64) is secured about the ports (42,44) in the gate and segment to bridge the gap (58) between the gate (32) and segment (34) upon expansion. A torsion spring (72) urges the gate and segment to a contracted position.

8 Claims, 5 Drawing Figures

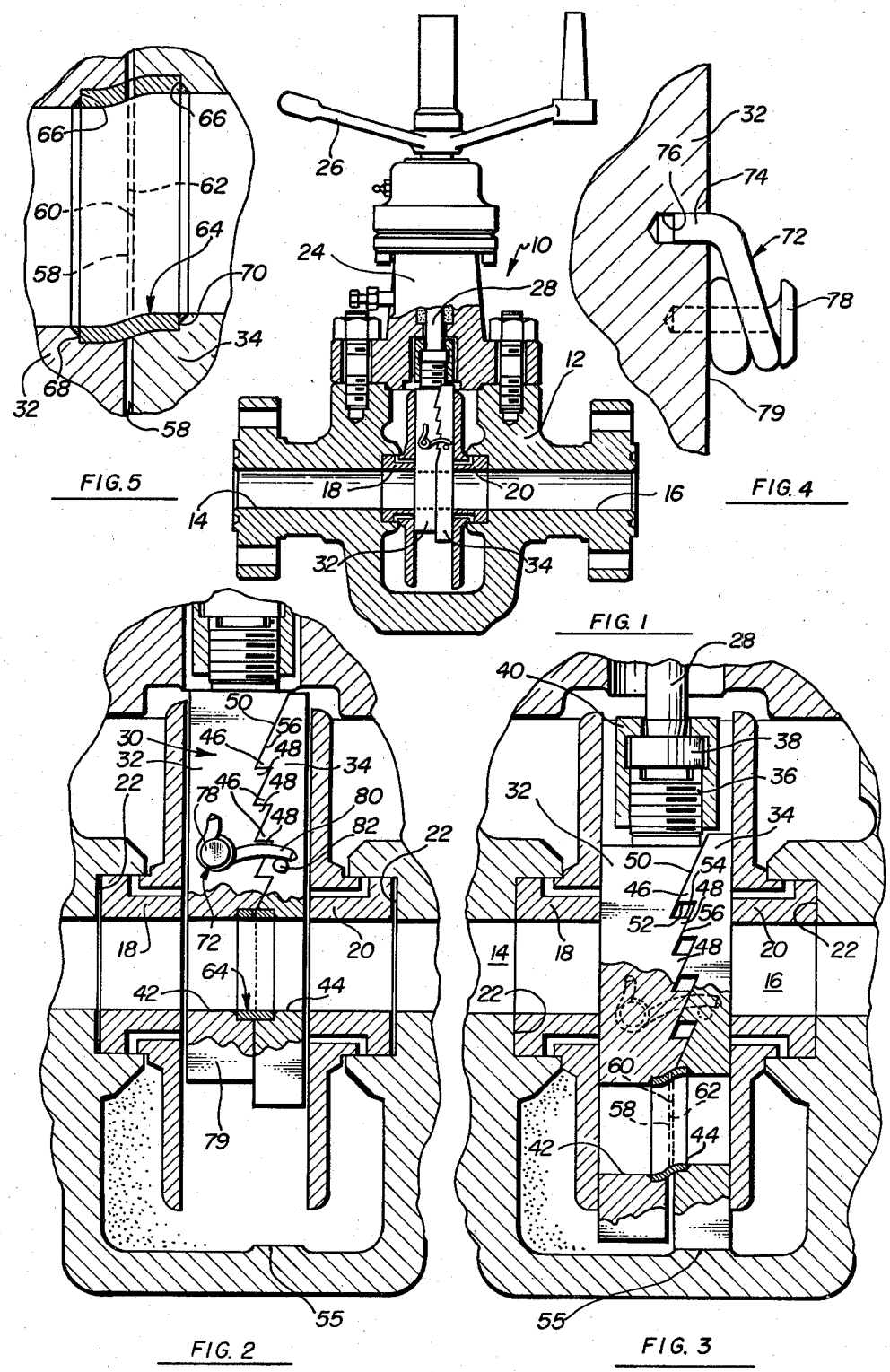

EXPANDING GATE VALVE

BACKGROUND OF THE INVENTION

This invention relates to gate valves and more particularly to gate valves of the expanding type comprising a valve assembly having a gate and segment which expand at fully opened and closed positions.

Heretofore, as shown in U.S. Pat. No. 3,893,652 dated July 8, 1975 expanding gate valve structures have been provided which include a gate and a segment carried by the gate with the gate and segment having opposed interfitting V-shaped faces. With the gate and segment each having a single interfitting V-shaped face, a relatively large thickness of the valve assembly is necessary to provide the V-shaped recess. Also, during movement between open and closed positions, a pre-expansion of the gate and segment might occur which will increase the operating torque required for moving the valve between open and closed positions. While a spring is shown in U.S. Pat. No. 3,893,652 to hold the gate and segment together, the spring must be tightly stressed in order to hold the gate and segment together during travel as a relatively small angle (between around 12° and 18°) is provided by the V-shaped faces relative to the direction of travel of the gate assembly between opened and closed positions.

Any pre-expansion of the gate and segment during travel is highly undesirable as binding against the adjacent seats and possible jamming of the valve assembly may occur.

DESCRIPTION OF PRESENT INVENTION

The present invention is directed to a valve assembly of the expanding type having a gate and segment with opposed surfaces between the gate and segment having a plurality of pairs of opposed interfitting saw-type teeth adjacent the upper end of the gate and segment which form a plurality of relatively short cam surfaces. This permits the use of a smaller thickness gate and segment than required for a gate valve assembly having a single V-shaped recess in the gate receiving the segment as heretofore.

The ports or openings in the gate and segment which define the flow passage are provided in the lower end of the valve assembly and the opposed surfaces or faces of the gate and segment immediately adjacent the ports are parallel to the direction of travel of the valve assembly between open and closed positions. Thus, upon an expansion of the gate and segment at the fully closed position of the valve assembly, a gap or space is formed between the gate and segment at the parts. To bridge this gap in order to prevent foreign matter from being deposited in the gap, a flexible liner sleeve is secured adjacent its ends to the gate and segment and extends across the gap. The liner is fitted within annular grooves about the ports in the gate and segment and secured at its ends to the gate and segment.

The surface defining one side or flank of each tooth extends in a direction generally at right angles to the direction of travel of the valve assembly to define a shoulder or stop with the shoulders of interfitting teeth in engagement with each other to limit relative longitudinal movement of the gate and segment in one direction of travel toward open position. Thus, no means are required to limit pre-expansion of the gate and segment when the valve assembly moves toward the fully open position. However, in the opposite direction of travel to the fully closed position, it is necessary to provide means to prevent or minimize any expansion of the gate and segment as the valve assembly moves from the open position to the fully closed position at which position the segment first engages a stop and subsequent relative movement of the gate expands the valve assembly. To accomplish this purpose, a torsion spring is mounted on each side of the gate and has an end portion thereof extending over the adjacent segment and engaging a pin or extension on the side of the segment to continuously urge the segment to a position in which the stop shoulders on interfitting teeth of the gate and segment are in contact.

BRIEF DESCRIPTION OF THE DRAWINGS

In the accompanying drawings in which one of various possible embodiments of the invention is illustrated:

FIG. 1 is a cross section of a gate valve structure embodying the present invention with the upper portion of the bonnet and handle shown in elevation;

FIG. 2 is an enlarged cross section of the valve assembly showing the gate and segment in full open position with the interfitting teeth being in abutting relation to each other;

FIG. 3 is a cross sectional view similar to FIG. 2 but showing the gate and segment at the fully closed expanded position of the valve assembly with the abutting shoulders of the interfitting teeth spaced from each other and a gap being formed between the parallel surfaces adjacent the ports in the lower end of the gate segment;

FIG. 4 is an enlarged fragment of the torsion spring urging the segment and gate to a collapsed or contracted position in one direction; and FIG. 5 is an enlarged fragment of FIG. 3 showing a flexible sleeve bridging the gap between the gate and segment at the fully closed position of the valve assembly.

Referring now to the drawings for a better understanding of the invention, the gate valve structure comprising the present invention is generally indicated at 10 and includes a valve body 12 having inlet and outlet flow passages 14 and 16. Skirted seats 18 and 20 fit within annular recesses 22 of body 12. A bonnet 24 is bolted to body 12 and a handle 26 is connected to a valve stem 28 for reciprocation of valve stem 28 upon rotation of handle 26 as is well known.

The gate valve assembly generally indicated at 30 is of the expanding type and comprises a gate 32 and a segment 34. Gate 32 has a threaded extension 26 on its upper end which fits against an enlarged end 38 of stem 28. A nut 40 is threaded on extension 36 to secure stem 28 to gate 32 for reciprocal movement therewith.

Gate 32 has a port 42 therein and segment 34 has a port 44 therein which align with flow passages 14 and 16 in the open position of valve assembly 30 as shown in FIGS. 1 and 2. The opposed surfaces of gate 32 and segment 34 have on their upper end thereof a plurality of saw-type interfitting teeth. Teeth 46 are arranged on segment 34 and interfit with teeth 48 on gate 32. Each tooth 46 has an upper flank 50, a lower flank 52, which join each other at a crest. Each tooth 48 has an upper flank 54 and a lower flank 56 which joint each other at a crest. Lower flanks 52 and upper flanks 54 extend generally at right angles to the direction of travel of valve assembly 30 between open and closed positions and about each other in the collapsed or contracted position of valve assembly 30 as shown in FIGS. 1 and 2. It is noted that upon movement of valve assembly 30 in an upward direction or toward open position that flanks 52 and 54 are in abutting relation to each other and therefore, no means are required to urge the gate and segment to a contracted position during this upward movement. However, during a downward movement of gate 32, it is possible that an undesired expansion between gate 32 and segment 34 might occur during this travel. As shown in FIG. 3 at the fully closed position, the lower end of segment 34 first contacts body 12 at a lower stop indicated at 55 and further rotation of handle 26 moves gate 32 downwardly relative to segment 34 to expand gate 32 and segment 34 by relative sliding movement along flanks 50 and 56 which act as cam surfaces. Flanks 50 and 56 form an angle between around 12° and 18° with respect to the direction of travel of valve assembly 30.

The relative movement between gate 32 and segment 34 forms a gap shown at 58 between one surface 60 on segment 34 which is formed immediately adjacent port 44 and on opposed surface 62 on gate 32 which is formed immediately adjacent port 42. Surfaces 60 and 62 extend in a direction parallel to the direction of travel of valve assembly 30 and are in contact relation to each other in the position of FIGS. 1 and 2. As shown in FIG. 5, a flexible liner sleeve generally indicated at 64 is mounted within recesses 66 of gate 32 and segment 34 which extend about ports 42 and 44. End 68 is secured, such as by welding, to gate 32 and end 70 is secured, such as by welding, to segment 34. It is apparent that sleeve 64 bridges gap 58 and minimizes the formation or accumulation of foreign matter or the like within gap 58. Liner sleeve 64 may be formed of a relatively thin metallic material or may be of a plastic or elastomeric material if desired. Suitable adhesives may be employed with plastic or elastomeric materials to secure the sleeve to gate 32 and segment 34.

To urge continuously flanks 52 and 54 into abutting contact relation with each other to minimize any undesired expansion between gate 32 and segment 34, a torsion spring indicated generally at 72, as shown particularly in FIG. 4, is mounted on each side 79 of gate 32. Each spring 72 has one end 74 thereof anchored within an opening 76 in gate 32. A pin 78 is received by torsion spring 72 and is mounted within side 79 of gate 32 to secure torsion spring 72. An arm or end portion 80 of torsion spring 72 engages a pin or extension 82 extending from the adjacent side of segment 34 and end portion 80 acts against pin 82 to continuously urge segment 34 in a direction so that flanks 52 and 54 of teeth 46 and 48 are in abutting relation to each other as shown in FIG. 2 in the fully contracted position of valve assembly 30. The anchored torsion spring 72 by acting in a single direction can be designed to obtain relatively high forces to hold gate 32 and segment 34 in retracted position.

From the foregoing, it is believed apparent that an expanding gate valve structure has been provided in which the gate and segment are provided with a plurality of saw-type interfitting pairs of teeth which act as cam surfaces in one direction and as stops in the opposite direction. This permits a minimum thickness combined gate and segment. Since the teeth limit relative movement between the gate and segment in one direction, a uni-directional torsion spring urging the gate and segment together in a direction generally parallel to the travel of the valve assembly is utilized. The torsion spring may be designed to provide high forces if desired.

What is claimed is:

1. A gate valve structure comprising:
   a valve body having a valve chamber therein and inlet and outlet flow passages communicating with the valve chamber;
   an expanding valve assembly mounted within the valve chamber for reciprocal movement between open and closed positions relative to said flow passages, said expanding valve assembly including a gate and a segment expanding away from each other at the fully closed position, a stem connected to said gate for movement of said gate between the open and closed positions;
   said gate and segment having ports therein adjacent one end thereof alignable with said flow passages in the open position of said valve assembly;
   said segment and gate having a plurality of contiguous interfitting teeth formed therein between the other end thereof and said ports thereof, said teeth providing a plurality of cam surfaces to effect expansion of the valve assembly upon relative longitudinal movement in one direction between the gate and segment, said segment being carried by said gate and engaging a stop at the fully closed position thereof to permit subsequent relative longitudinal movement of the gate and lateral expansion of the valve assembly at said fully closed position.

2. In a gate valve structure as set forth in claim 1 wherein coacting holding means are mounted on said gate and segment to hold the segment and gate in a contracted position during movement of the gate and segment between open and closed positions.

3. In a gate valve structure as set forth in claim 2 wherein said coacting holding means comprises a torsion spring anchored to one side of the gate adjacent the segment and having an arm engaging an extension on the adjacent segment to urge the segment continuously toward a contracted position relative to the gate.

4. In a gate valve structure as set forth in claim 1 wherein the opposed surfaces of the gate and segment adjacent said one end thereof at said ports are parallel to the longitudinal axis of the stem, and a flexible liner sleeve is mounted within the ports of the gate and segment and bridges the gap between the gate and segment which is formed between said opposed surfaces when the gate and segment expand laterally away from each other at the fully closed position, said sleeve being secured adjacent its ends to the gate and segment.

5. A gate valve structure comprising a valve body having a valve chamber therein and inlet and outlet flow passages communicating with the valve chamber;
   an expanding valve assembly having a pair of valve members mounted within the valve chamber for reciprocal movement between open and closed positions relative to the flow passages, said valve members comprising a gate and a segment which expand away from each other at a fully closed position and have ports therein alignable with said flow passages in the open position of the valve assembly;
   said segment and gate having a plurality of contiguous interfitting teeth therebetween adjacent said ports and defining generally parallel facing cam surfaces joined by corresponding flanks generally perpendicularly disposed with respect to the longitudinal axis of the stem to effect expansion of the valve assembly upon relative longitudinal movement in one direction between said gate and said segment, said segment being carried by said gate and engaging a stop at the fully closed position thereof to permit subsequent relative longitudinal movement of the gate and lateral expansion of the valve assembly at said fully closed position.

6. A gate valve structure as set forth in claim 5 wherein said cam surfaces are disposed at an angle between approximately twelve degrees and approximately eighteen degrees with respect to the direction of travel of the valve assembly.

7. A gate valve as set forth in claim 5 further including a torsion spring mounted on a side of one of the valve members closely adjacent the other valve member and having an end portion extending over said other valve member, and an extension on said other valve member engaging the end portion of said torsion spring for urging the valve members continuously toward a contracted relation.

8. A gate valve structure as set forth in claim 5 wherein each of said flanks defines a stop to limit relative longitudinal movement between said gate and segment in an opposite direction.

* * * * *